US008977578B1

(12) United States Patent     (10) Patent No.:   US 8,977,578 B1
Cruz-Albrecht et al.     (45) Date of Patent:   Mar. 10, 2015

(54) SYNAPTIC TIME MULTIPLEXING NEUROMORPHIC NETWORK THAT FORMS SUBSETS OF CONNECTIONS DURING DIFFERENT TIME SLOTS

(75) Inventors: Jose M. Cruz-Albrecht, Oak Park, CA (US); Narayan Srinivasa, Oak Park, CA (US); Peter Petre, Oak Park, CA (US); Youngkwan Cho, Los Angeles, CA (US); Aleksey Nogin, Fresno, CA (US)

(73) Assignee: HRL Laboratories, LLC, Malibu, CA (US)

( * ) Notice: Subject to any disclaimer, the term of this patent is extended or adjusted under 35 U.S.C. 154(b) by 335 days.

(21) Appl. No.: 13/535,114

(22) Filed: Jun. 27, 2012

(51) Int. Cl.
    *G06F 15/18*    (2006.01)
    *G06N 3/04*    (2006.01)

(52) U.S. Cl.
    CPC ................................ *G06N 3/04* (2013.01)
    USPC .......................................................... 706/12

(58) Field of Classification Search
    USPC ................................................ 706/12, 45, 62
    See application file for complete search history.

(56) References Cited

U.S. PATENT DOCUMENTS

| | | | |
|---|---|---|---|
| 5,274,748 | A | 12/1993 | Boser et al. |
| 8,510,244 | B2 * | 8/2013 | Carson et al. .................. 706/27 |
| 2007/0092958 | A1 * | 4/2007 | Syed et al. ................ 435/173.8 |
| 2011/0004579 | A1 * | 1/2011 | Snider ............................. 706/25 |

OTHER PUBLICATIONS

Bailey et al., "Why VLSI implementation of associative VLCNs require connection multiplexing," in Proc. IEEE Int. Conf. Neural Netw., San Diego, CA, Jul. 1988, pp. 173-180.

Strukov et al., "Prospects for terabit-scale nanoelectronic memories," Nanotechnology, vol. 16, No. 1, pp. 137-148, 2005.
Jo et al., "Nanoscale memristor device as synapse in neuromorphic systems," Nano Lett., vol. 10, No. 4, pp. 1297-1301, 2010.
Gao et al., "Cortical models onto CMOL and CMOS architectures and performance/price," IEEE Trans. Circuits Syst. I, Reg. Papers, vol. 54, No. 11, pp. 2502-2515, Nov. 2007.
Partzsch et al., "Analyzing the scaling of connectivity in neuromorphic hardware and in models of neural networks," IEEE Trans. Neural Netw., vol. 22, No. 6, pp. 919-935, Jun. 2011.
Indiveri et al., "Neuromorphic silicon neuron circuits," Frontiers Neurosci., vol. 5, No. 73, pp. 1-23, 2011.
Srinivasa et al., "Analog learning systems of neuromorphic adaptive plastic scalable electronics," IEEE Pulse, vol. 3, No. 1, pp. 51-56, Jan.-Feb. 2012.
Markram et al., "Regulation of synapticefficacy by coincidence of postsynaptic APs and EPSPs," Sci. Mag., vol. 2, vol. 75, pp. 213-215, 1997.

(Continued)

*Primary Examiner* — David Vincent
(74) *Attorney, Agent, or Firm* — North Shore Associates

(57) ABSTRACT

A synaptic time-multiplexed (STM) neuromorphic network includes a neural fabric that includes nodes and switches to define inter-nodal connections between selected nodes of the neural fabric. The STM neuromorphic network further includes a neuromorphic controller to form subsets of a set of the inter-nodal connections representing a fully connected neural network. Each subset is formed during a different time slot of a plurality of time slots of a time multiplexing cycle of the STM neuromorphic network. In combination, the inter-nodal connection subsets implement the fully connected neural network. A method of synaptic time multiplexing a neuromorphic network includes providing the neural fabric and forming the subsets of the set of inter-nodal connections.

16 Claims, 5 Drawing Sheets

(56) References Cited

OTHER PUBLICATIONS

Bi et al., "Activity-induced synaptic modifications in hippocampal culture: Dependence on spike timing, synaptic strength and cell type," J. Neurosci. vol. 18, No. 24, pp. 10464-10472, 1998.
Izhikevich, "Polychronization: Computation with spikes," Neural Comput., vol. 18, No. 2, pp. 245-282, 2006.
Izhikevich et al., "Spike-timing Dynamics of Neuronal Groups," Cerebral Cortex, vol. 14, No. 8, pp. 933-944, 2004.
Vogels et al., "Neural network dynamics," Annu. Rev. Neurosci., vol. 28, pp. 357-376, Jul. 2005.
Chen et al., "Real-time simulation of biologically realistic stochastic, neurons in VLSI," IEEE Trans. Neural Netw., vol. 21, No. 9, pp. 1511-1517, Sep. 2010.
Sharma et al., "Accelerating FPGA routing using architecture-adaptive A* techniques," in Proc. IEEE Int. Field-Program. Technol. Conf., Dec. 2005, pp. 225-232.
Kim et al., "A functional hybrid memristor crossbar-array/cmos system for data storage and neuromorphic applications," Nano Lett., vol. 12, No. 1, pp. 389-395, 2012.
Wheeler et al., "CMOS integrated memristors for neuromorphic architectures," in Proc. Int. Semicond. Device Res. Symp., Dec. 2011, pp. 1-2.
Merolla et al., "Expandable networks for neuromorphic chips," IEEE Trans. Circuits Syst. I, vol. 54, No. 2, pp. 301-311, Feb. 2007.
Khan et al., "SpiNNaker: Mapping neural networks onto a massively-parallel chip multiprocessor," in Proc. IEEE Int. Joint Conf. Neural Netw. World Congr. Comput. Intell., Jun. 2008, pp. 2849-2856.
Schemmel et al., "Implementing synaptic plasticity in a VLSI spiking neural network model," in Proc. Int. Joint Conf. Neural Netw., 2006, pp. 1-6.
Schemmel et al., "A wafer-scale neuromorphic hardware system for large-scale neural modeling," in Proc. IEEE Int. Symp. Circuits Syst., May-Jun. 2010, pp. 1947-1950.
Serrano-Gotarredona et al., "CAVIAR: A 45k neuron, 5M synapse, 12G connects/s AER hardware sensory-processing-learning-actuating system for high-speed visual object recognition and tracking," IEEE Trans. Neural Netw., vol. 20, No. 9, pp. 1417-1438, Sep. 2009.
Indiveri et al., "Frontiers in neuromorphic engineering," Frontiers Neurosci., vol. 5, No. 118, pp. 1-2, 2011. [27] M. Mahowald, "VLSI analogs of neuronal visual processing: A synthesis of form and function," Ph.D. dissertation, Dept. Comput. Neural Syst., California Inst. Technol., Pasadena, 1992.
Boahen, "A burst-mode word-serial address-event link-I: Transmitter design," IEEE Trans. Circuits Syst. I, vol. 51, No. 7, pp. 1269-1280, Jul. 2004.
Boahen, "A burst-mode word-serial address-event link-II: Receiver design," IEEE Trans. Circuits Syst. I, vol. 51, No. 7, pp. 1281-1291, Jul. 2004.
Boahen, "Point-to-point connectivity between neuromorphic chips using address events," IEEE Trans. Circuits Syst. II, vol. 47, No. 5, pp. 416-434, May 2000.
Indiveri et al., "A reconfigurable neuromorphic VLSI multichip system applied to visual motion computation," in Proc. 7th Int. Conf. Microelectron. Neural, Fuzzy Bio-Inspired Syst., 1999, pp. 37-44.
Luu et al., "VPR 5.0: FPGA cad and architecture exploration tools with singledriver routing, heterogeneity and process scaling," in Proc. ACM/SIGDA Int. Symp. Field Program. Gate Arrays, 2009, pp. 1-10.

Viswanathan et al., "FastPlace 3.0: A fast multilevel quadratic placement algorithm with placement congestion control," in Proc. Asia South Pacific Design Autom. Conf., Jan. 2007, pp. 135-140.
Padmini et al., "Architecture-aware FPGA placement using metric embedding," in Proc. 43rd Annu. Design Autom. Conf., 2006, pp. 1-6.
Dehon, "Balancing interconnect and computation in a reconfigurable computing array," in Proc. ACM/SIGDA 7th Int. Symp. Field Program. Gate Arrays, 1999, pp. 1-10.
Achard et al., "A resilient, low-frequency, small-world human brain functional network with highly connected association cortical hubs," J. Neurosci., vol. 26, pp. 63-72, Jan. 2006.
Dongarra et al., "A sparse matrix library in C++ for high performance architectures," in Proc. 2nd Object Oriented Numerics Conf., 1994, pp. 214-218.
Ren et al., "Diffusion-based placement migration," in Proc. 42nd Annu. Design Autom. Conf., 2005, pp. 1-6.
Hart et al., "A formal basis for the heuristic determination of minimum cost paths," IEEE Trans. Syst. Sci. Cybern., vol. 4, No. 2, pp. 100-107, Jul. 1968.
Huffman, "A method for the construction of minimum-redundancy codes," Proc. IRE, vol. 40, No. 9, pp. 1098-1102, Sep. 1952.
Welch, "A technique for high-performance data compression," IEEE Comput., vol. 17, No. 6, pp. 8-19, Jun. 1984.
Hodgkin et al., "A quantitative description of membrane current and application to conduction and excitation in nerve," J. Phys., vol. 117, No. 4, pp. 500-544, 1952.
Izhikevich, "Which model to use for cortical spiking neurons?" IEEE Trans. Neural Netw., vol. 15, No. 5, pp. 1063-1070, Sep. 2004.
Fitzhugh, "Impulses and physiological states in theoretical models of nerve membrane," Biophys. J., vol. 1, No. 6, pp. 445-466, 1961.
Brette et al., "Adaptive exponential integrate and fire model as an effective description of neuronal activity," J. Neurophys., vol. 94, No. 5, pp. 3637-3642, 2005.
Bartolozzi et al., "Synaptic dynamics in analog VLSI," Neural Comput., vol. 19, No. 10, pp. 2581-2603, 2007.
Turrigiano et al., "Homeostatic plasticity in the developing nervous system," Nature Rev. Neurosci., vol. 5, No. 2, pp. 97-107, 2004.
Song et al., "Competitive Hebbian Learning Through Spike-Timing Dependent Synaptic Plasticity," Nature Neuroscience, vol. 3, 2000, pp. 919-926.
Fuhrmann et al., "Spike frequency adaptation and neocortical rhythms," J. Neurophys., vol. 88, No. 2, pp. 761-770, 2002.
Boegerhausen et al., "Modeling short-term synaptic depression in silicon," Neural Comput., vol. 15, No. 2, pp. 331-348, 2003.
Wu et al., "Contribution of AMPA, NMDA, and GABA(A) receptors to temporal pattern of postsynaptic responses in the inferior colliculus of the rat," J. Neurosci., vol. 24, No. 19, pp. 4625-4634, 2004.
Hynna et al., "Neuronal ion-channel dynamics in silicon," in Proc. IEEE Circuits Syst. ISCAS Int. Symp., May 2006, pp. 3614-3617.
McMurchie et al., "PathFinder: A negotiation-based performance-driven router for FPGAs," in Proc. 3rd Int. ACM Symp. Field Program. Arrays, 1995, pp. 111-117.
Hines et al., "Neuron: A tool for neuroscientists," Neuroscientist, vol. 7, No. 2, pp. 123-135, 2001.
Minkovich et al., "Programming Time-Multiplexed Reconfigurable Hardware Using a Scalable Neuromorphic Compiler," IEEE Trans. on Neural Networks and Learning Systems, vol. 23, No. 6, Jun. 2012, pp. 889-910.

* cited by examiner

SYNAPTIC TIME MULTIPLEXING NEUROMORPHIC NETWORK THAT FORMS SUBSETS OF CONNECTIONS DURING DIFFERENT TIME SLOTS

STATEMENT REGARDING FEDERALLY SPONSORED RESEARCH OR DEVELOPMENT

This invention was made with Government support under Contract No. HRL 0011-09-C-0001 awarded by DARPA. The Government has certain rights in the invention.

CROSS-REFERENCE TO RELATED APPLICATIONS

N/A

BACKGROUND

1. Technical Field

The invention relates to analog circuits, systems and related signal processing. In particular, the invention relates to elements and processing used in synapses of biologically inspired neuromorphic circuits and systems.

2. Description of Related Art

Complex, real-time and near real-time processing and control applications are becoming more commonplace and important. Examples include, but are not limited to, real-time image processing, as well as processing data, from a large array of sensors (e.g., a focal plane array of optical sensors) that may involve simultaneous processing of multiple, parallel channels from the sensor array. Such real-time processing often presents significant design challenges including, but not limited to, providing implementations that have sufficient processing power and at the same time exhibit reasonable energy efficiency. Neuromorphic circuits and related circuit topologies may offer a solution to some of these significant obstacles associated with the design and implementation of real-time processing and control.

Neuromorphic circuits are electronic circuits that mimic the operation of cell populations within a nervous system and as such, may offer a number of advantages for robust signal processing in support of various real-time control and sensor processing applications. In particular, neuromorphic circuits may facilitate robust signal processing in a manner that mimics certain populations of neural cells including, but not limited to, populations of neural cells found in the brain of an animal, for example. As an animal's brain is generally adept at processing and interpreting a barrage of signals received from an animal's environment in a robust and energy efficient manner, so too are various neuromorphic circuits that mimic brain-like functions. Specifically, the neuromorphic circuit may perform various brain-like functions in a manner substantially similar to, or at least modeled on, its biological counterpart. However, the challenge remains to develop practical implementations of neuromorphic circuits and more particularly, low-power integrated circuit implementations thereof, that can be applied to real-time control and processing systems.

BRIEF SUMMARY

In some embodiments, a synaptic time-multiplexed (STM) neuromorphic network is provided. The STM neuromorphic network comprises a neural fabric having nodes and switches to define inter-nodal connections between selected nodes of the neural fabric. The STM neuromorphic network further comprises a neuromorphic controller to form subsets of a set of the inter-nodal connections representing a fully connected neural network. In various examples, each subset being formed during a different time slot of a plurality of time slots of a time multiplexing cycle of the STM neuromorphic network. In combination, the inter-nodal connection subsets implement the fully connected neural network.

In some embodiments, a method of synaptic time multiplexing a neuromorphic network is provided. The method of synaptic time multiplexing comprises receiving a neural fabric of the neuromorphic network. The neural fabric comprises a plurality of neurons and associated synapses interconnected by a plurality of switches. Selective switch activation defines a connection between an output of a first neuron and a synapse connected to an input of a second neuron of the neural fabric. The method of synaptic time multiplexing further comprises forming subsets of a set of connections representing a fully connected neural network within the neural fabric using the selective switch activation. In various examples, each subset is formed sequentially during a different time slot of a plurality of time slots of a synaptic time multiplexing cycle of the neuromorphic network. The sequentially formed connection subsets in combination implement the fully connected neural network.

In some embodiments, a method of scalable routing of connections in a synaptic time-multiplexed (STM) neuromorphic network is provided. The method of scalable routing comprises attempting to route connections between pairs of nodes of a fully connected neural network. A successfully routed connection defines a signal path between the pair of nodes in a first time slot of the STM neuromorphic network. The method of scalable routing further comprises repeating an attempt to route connections of the fully connected neural network for each node pair which attempting to route connections failed to produce a defined signal path between the nodes of the pair. A successfully routed connection produced by repeating an attempt to route connections defines a signal path between nodes in a second time slot of the STM neuromorphic network.

In some embodiments, a method of verifying connection routing in a synaptic time-multiplexed (STM) neuromorphic network is provided. The method of verifying connection routing comprises encoding as a plurality of binary images connections between pairs of nodes in a neural fabric of the STM neuromorphic network. Each binary image of the plurality represents node pair connections in a different time slot of a synaptic time multiplexing cycle of the STM neuromorphic network. The method of verifying connection routing further comprises combining the binary images of the plurality to create a combined time slot image and determining a difference between the combined time slot image and a binary image created using connections of a fully connected neural network.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1A:
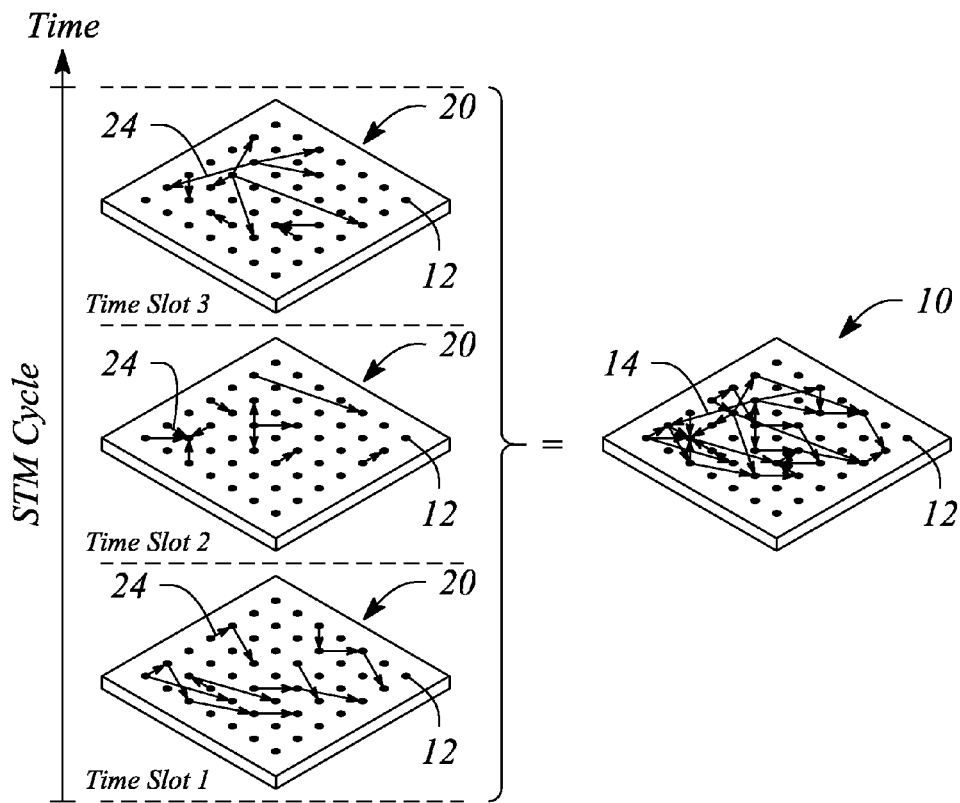
FIG. 1A illustrates a schematic representation of synaptic time multiplexing, according to an embodiment consistent with the principles of the present invention.

Certain examples have other features that are one of in addition to and in lieu of the features illustrated in the above-referenced figures. These and other features are detailed below with reference to the above-referenced figures.

DETAILED DESCRIPTION

Embodiments consistent with the principles of the present invention provide synaptic time multiplexing that may be used in conjunction with various neuromorphic circuits and systems. In particular, examples in accordance with the principles described herein time multiplex a plurality of physical or 'actual' connections within a network to provide a relatively larger number of virtual connections. The time-multiplexed connections typically involve synapses that serve as inputs of nodes within a neural network so the time multiplexing may be referred to as 'synaptic time multiplexing.' With synaptic time multiplexing, the ability to provide a relatively larger number of virtual connections may facilitate realizing a neuromorphic network with a much simpler architecture than without synaptic time multiplexing. For example, the neuromorphic network may be able to represent a functionality of a complex fully connected neural network with far fewer physical synapses than would be used in in a neural network that does not employ synaptic time multiplexing. In some embodiments, a neuromorphic network that employs or is based on synaptic time multiplexing according to the principles described herein may yield neuromorphic constructs which are highly scalable while simultaneously being practical to implement using available circuit technology.

According to various examples of the principles described herein, a synaptic time-multiplexed neuromorphic network represents a fully connected neural network as a sequence or series of decoupled sub-networks. By definition herein, the decoupled sub-network provides a subset of the connections of a set of connections that are present in the fully connected neural network. In some embodiments, each of the decoupled sub-network provides a subset of the set of connections of the fully connected neural network. The decoupled sub-networks combine during time multiplexing to achieve the connectivity and functionality of the fully connected neural network.

According to various examples, synaptic time multiplexing divides or breaks down the fully connected neural network into a plurality of decoupled sub-networks. The plurality of decoupled sub-networks comprises all of the nodes of the fully connected neural network. However, each of the decoupled sub-networks comprises only a subset of a set of connections between nodes that is represented by the fully connected neural network. Synaptic time multiplexing further forms the fully connected neural network as a time series of the various decoupled sub-networks. In particular, synaptic time multiplexing forms the decoupled sub-networks in different time slots of a synaptic time multiplexing cycle. In some embodiments, each of the decoupled sub-networks is formed in the different time slots. When the synaptic time multiplexing cycle is completed, all of the decoupled sub-networks have been formed. Moreover, when combined over a period of the synaptic time multiplexing cycle, the decoupled sub-networks and their respective subsets of connections produce the fully connected neural network.

FIG. 1A illustrates a schematic representation of synaptic time multiplexing, according to an embodiment consistent with the principles of the present invention. In particular, a right side of FIG. 1A illustrates a fully connected neural network 10 in terms of nodes 12 and connections 14 between nodes. A left side of FIG. 1A illustrates three decoupled sub-networks 20, by way of example. A sub-network 20 comprises the nodes 12 of the fully connected neural network. Further, the sub-network 20 comprises a subset of the connections 24 in the fully connected neural network 10. For example, the respective subset of the connections 24 may be different for each sub-network 20. Combined, the connections 24 of the subsets equal the set of the connections 14 of the fully connected neural network 10 as indicated by an equal sign ('=') in FIG. 1A. Moreover, the subsets of the connections 24 illustrated in FIG. 1A may be executed or otherwise formed during separate time slots of a synaptic time multiplexing cycle (e.g., time slots 1, 2 and 3, as illustrated). When combined or summed together, the subsets of connections 24 formed during the separate time slots produce all of the connections 14 of the fully connected neural network 10. As such, once every synaptic time multiplexing cycle, the fully connected neural network 10 may be realized by the sequential formation of the subsets of connections 24 represented by the decoupled sub-networks 20.

Figure 1B:
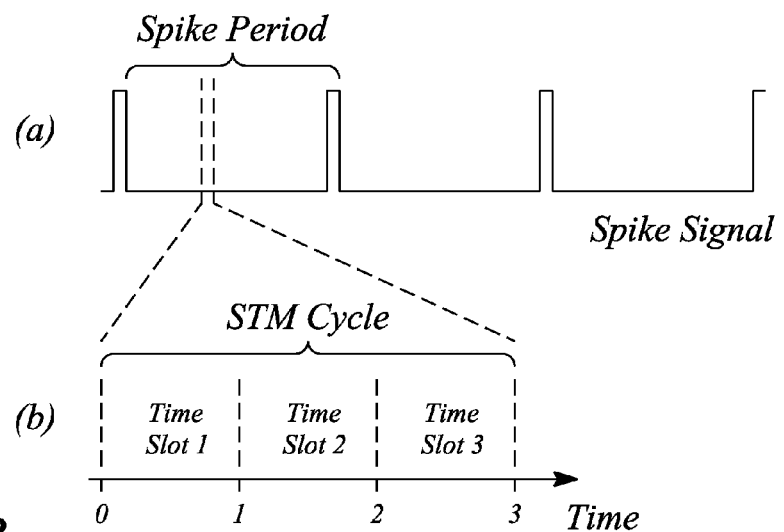
FIG. 1B illustrates a graphical representation of a synaptic time multiplexing cycle, according to an embodiment consistent with the principles of the present invention.

FIG. 1B illustrates a graphical representation of a synaptic time multiplexing cycle, according to an embodiment consistent with the principles of the present invention. Also illustrated is a plot of an example spike signal. In particular, an upper portion of FIG. 1B labeled (a) illustrates the spike signal having a spike period and a lower portion of FIG. 1B labeled (b) illustrates a synaptic time multiplexing cycle of the spike period. The synaptic time multiplexing cycle includes three time slots, as illustrated by way of example. The three time slots may be the time slots during which the decoupled sub-networks 20 of FIG. 1A are formed. For example, during a first time slot (e.g., time slot 1) of FIG. 1B, a first decoupled sub-network 20 (or e.g., connections 24 thereof) may be formed. Then, during a second time slot (e.g., time slot 2) and a third time slot (e.g., time slot 3) of FIG. 1B, a second decoupled sub-network 20 and third decoupled sub-network 20, respectively, (or e.g., connections 24 thereof) of FIG. 1A may be formed, for example. At an end of the synaptic time multiplexing cycle, all of decoupled sub-networks, and by extension all of the subsets of connections 24, have been formed such that all of the connections 14 of the fully connected neural network 10 have been formed. Further, the synaptic time multiplexing cycle is a fraction of the spike period of the spike signal, as illustrated in FIG. 1B. According to various examples, the synaptic time multiplexing cycle may be repeated in each spike period and is timed to be completed during a spike of the spike signal. Further discussion of synaptic time multiplexing is provided by Minkovich et al., "Programming Time-Multiplexed Reconfigurable Hardware Using a Scalable Neuromorphic Compiler," *IEEE Trans. on Neural Networks and Learning Systems*, Vol. 23, No. 6, June 2012, pp. 889-910, incorporated herein by reference in its entirety.

According to various examples, circuits and systems that employ synaptic time multiplexing may transmit signals within and among elements of the circuits and systems as spike signals. Herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented simply as 'S'. Herein, a 'spike signal', also referred to as an action potential, is defined herein as a signal that comprises two states as a function of time (t). According to some embodiments, a first state of the two states is referred to as a low or 'OFF' state and a second state of the two states is referred to as a high or 'ON' state, in some embodiments. In various examples, the states may represent one or both of voltage or current values or levels. For example, the first state may be a first voltage (e.g., 0 millivolts (mV)) and the second state may be second voltage (e.g., 1 mV). Alternatively, the states may be represented by values of current such that the first state is a first current (e.g., 0 microamps (µA)) and the second state is a second current (e.g., 10 µA). A spike signal in which the states are represented as voltage values may be referred as a 'voltage' spike signal. Similarly, a spike signal in which values of current represent the states may be referred to as a 'current' spike signal.

Further, a spike signal is generally characterized by being in or exhibiting one of the two states (e.g., the first or OFF state) for a majority of the time t with only brief transitions to the other state (e.g., the second or ON state), by definition herein. For example, the spike signal may exhibit a sequence of spikes of the ON state that are separated by relatively longer periods or inter-spike intervals (i.e., relative to a length of the spike) at the OFF state. According to various examples, a ratio of a length in time of a spike or 'spike time' to a length in time of an inter-spike interval or 'inter-spike interval time' is generally much less than one. In some embodiments, the ratio may be less than about 0.2. In some embodiments, the ratio is generally less than about 0.1 and may even be less than about 0.05. For example, the OFF state inter-spike interval time may be about 10 second (s) while the spike time of the ON state may have a length of about 1 second (s), for example. In another example, the ON state spike time may be about 0.1 s, while the OFF state inter-spike interval time between a pair of ON state spikes may be between about 1 s and about 10 s or more.

According to various examples, the spikes of the spike signal may be either aperiodic or periodic. For example, an aperiodic spike signal may comprise a series of spikes that occur at substantially random times or having substantially random inter-spike intervals. On the other hand, the spike signal may be a periodic spike signal that exhibits spikes at regular and repeating points in time. For example, a periodic spike signal may have a spike every 10 s. In another example, spikes may occur at intervals of about 5 s in another periodic spike signal. Such periodic spike signals are often said to have or exhibit a duty cycle. Herein, 'duty cycle' is defined in the usual sense as a ratio of a length of a spike to a time interval between spikes in a periodic spike signal.

Further, a periodic spike signal may be piece-wise or quasi-periodic as used herein. In particular, the periodic spike signal may be periodic for only a finite and relatively short period of time. For example, a periodic spike signal may comprise a sequence of five or ten spikes in a periodic sequence. In another example, a periodic spike signal may comprise a finite sequence of periodic spikes (e.g., 5 spikes) followed by a relatively long interval of no spikes that may be further followed by another finite sequence of periodic spikes. The other finite sequence of periodic spikes may have the same number (e.g., 5) or a different number (e.g., 1, 2, 3, 4, 6, 7, 8, . . . ) of spikes, for example. In other embodiments, a duty cycle or equivalently an inter-spike interval of spikes of a periodic spike signal may vary as a function of time.

In some embodiments, spikes of a spike signal (either aperiodic or periodic) may occur asynchronously. By 'asynchronously' it is meant by definition that timing of a spike in the spike signal is not determined or otherwise tied to a particular clock signal. In particular, spikes of a pair of spike signals may be asynchronous with respect to one another. Timing of the spikes in the pair of asynchronous spike signals is or may be substantially uncorrelated between the pair. As such, spikes of a first spike signal of the pair may occur at any time relative to spikes of a second spike signal of the pair since the pair of spike signals are not tied to or otherwise regulated by a master clock signal.

Herein, a 'fully connected' neural network is a neural network defined by a particular set of connections that interconnect a plurality of nodes in a predetermined manner. In particular, the plurality of interconnected nodes comprises a plurality of pairs of nodes that are connected to one another by a signal path between the nodes. According to various examples, routing determines a path through a neural fabric that provides the signal path and thus the interconnection between pairs of interconnected nodes.

Herein, 'spike timing dependent plasticity (STDP)' is defined as a characteristic that is observed in synapses in the brain generally involving an adjustment of a strength of a connection or 'synapse' between a pair of neurons. The adjustment may be defined by an STDP learning rule that establishes a variation in a synaptic conductance or weight w, based on a time difference (both positive and negative) or relative timing of input and output action potentials (i.e., spikes) at the synapse. The STDP learning rule relates a change $\Delta w$ in the synaptic conductance of a synapse that connects a pair of neurons to a timing difference ($\Delta t_{i,j} = t_i^{pre} - t_j^{post}$) between the output action potential of a pre-synaptic neuron ($t_i^{pre}$) and the input action potential of a post-synaptic neuron ($t_j^{post}$). In particular, as defined by the STDP learning rule, the synaptic conductance w undergoes depression according to an exponential decay of the right half of the STDP learning rule when the timing difference $\Delta t_{i,j}$ is positive. Alternatively, in response to a negative timing difference $\Delta t_{i,j}$, the synaptic conductance w undergoes potentiation according to an exponential decay of the left half of the STDP learning rule. The change or adjustment of the synaptic conductance w provided by the STDP learning rule may substantially mimic observed changes in the synaptic conductance w associated with synapses between neurons in the brain, according to some embodiments. A further discussion of the STDP learning rule may be found in Song et al., "Competitive Hebbian Learning Through Spike-Timing Dependent Synaptic Plasticity," *Nature Neuroscience*, Vol. 3, 2000, pp. 919-926, for example, incorporated herein by reference.

Examples consistent with the principles described herein may be implemented using a variety of devices including, but not limited to, integrated circuits (ICs), very large scale integrated (VLSI) circuits, application specific integrated circuits (ASIC), software, firmware or a combination of two or more of the above. For example, elements or 'blocks' of an apparatus consistent with the principles described herein may all be implemented as circuit elements within an ASIC or a VLSI circuit. In another example, the entire apparatus may be implemented as software using a computer programming language (e.g., C/C++) or software-based modeling environment (e.g., Matlab). In yet another example, some of the blocks may be implemented using actual circuitry (e.g., as an IC or an ASIC) while other blocks may be implemented in software or firmware.

Further, as used herein, the article 'a' is intended to have its ordinary meaning in the patent arts, namely 'one or more'. For example, 'a signal' means one or more signals and as such, 'the signal' means 'the signal(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples and embodiments herein are intended to be illustrative only and are presented for discussion purposes and not by way of limitation.

Figure 2:
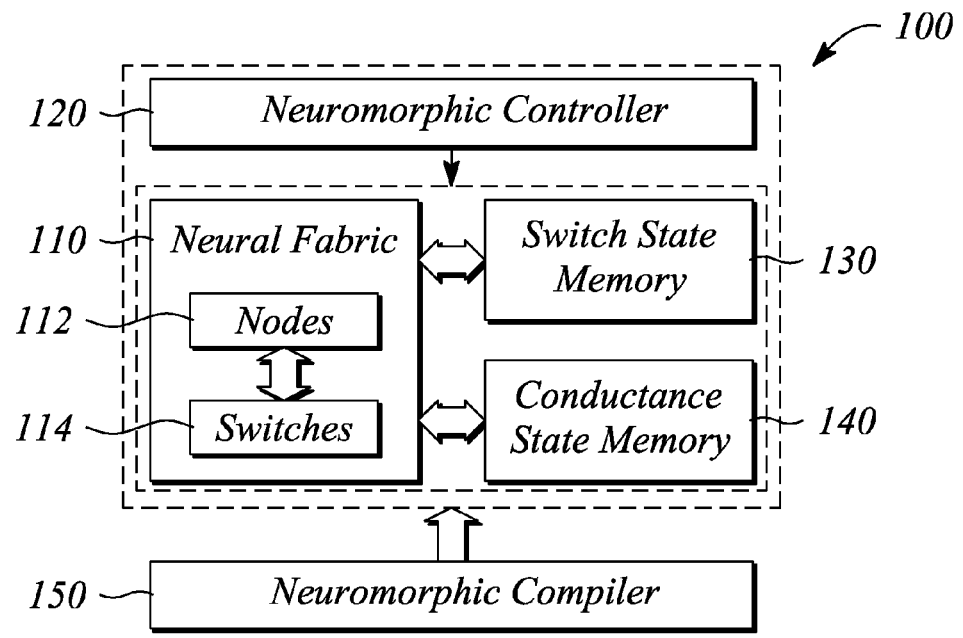
FIG. 2 illustrates a block diagram of a synaptic time-multiplexed (STM) neuromorphic network, according to an embodiment consistent with the principles of the present invention.

FIG. 2 illustrates a block diagram of a synaptic time-multiplexed (STM) neuromorphic network 100, according to an embodiment consistent with the principles of the present invention. The STM neuromorphic network 100 is configured to implement a fully connected neural network using time multiplexing. In particular, physical connections that provide signal pathways within the STM neuromorphic network 100 are time multiplexed to realize virtual connections. The virtual connections, when considered together as a set of connections, implement all of the connections of the fully connected neural network, according to various examples. Through time multiplexing, the STM neuromorphic network 100 may provide a set of connections that is much denser (e.g., contains higher connectivity, greater synaptic densities, etc.) than is possible without time multiplexing.

The STM neuromorphic network 100 comprises a neural fabric 110. The neural fabric 110 comprises a plurality of nodes 112 and a plurality of switches 114. The switches 114 are configured to interconnect the nodes 112 of the neural fabric 110. In particular, selective activation of the switches 114 defines an inter-nodal connection between a first node 112 and a second node 112 of the neural fabric 110. For example, the defined inter-nodal connection may be a connection between an output of the first node 112 and an input of the second node 112. The inter-nodal connection formed by the selective activation of the switches 114 may provide a signal pathway between the first and second nodes 112, for example. According to various examples, the selective activation may define multiple inter-nodal connections. Moreover, the inter-nodal connections are reconfigurable by virtue of the selective activation, according to various examples.

According to some embodiments, the node 112 comprises a neuron. An output of the neuron is connected to an output of the node 112. According to various examples, the neuron of the node 112 may have between one and a plurality of different inputs or input ports to receive input signals. For example, a particular neuron may have one, two, three, four or more inputs, including many more inputs. The input signal received by the neuron of the node 112 may take on any of several forms. For example, the input signal may be a spike signal. Likewise, the neuron may produce an output (i.e., an output signal) that has one of several forms including, but not limited to, a spike signal.

According to various examples, the 'neuron', by definition herein, is a neuromorphic construct that mimics or emulates the neuro-biological characteristics of a biological neuron. In various examples, the neuron may comprise any of a number of neuromorphic constructs including, but not limited to, a complimentary metal oxide semiconductor (CMOS) neuron circuit and a memristor-based neuron circuit. In other embodiments, the neuron may be a software-based neuron or a firmware-based neuron that, in whole or in part, employs a software or firmware simulation of the neuro-biological characteristics of the biological neuron. For example, the neuron may be implemented based on a leaky integrate and fire neuron model that comprises a leaky integrator and is compatible with spike signals. Any of a variety of other neuron implementations including, but not limited to, a Hodgkin-Huxley neuron, Izhikevich neuron, and a current or conductance integrate and fire (e.g., an adaptive exponential integrate and fire model) neuron may be employed as the neuron herein, according to various examples. Further example neuron implementations may be found, for example, in FIG. 2 of E. M. Izhikevich, "Which Model to Use for Cortical Spiking Neurons?," *IEEE Transactions on Neural Networks*, 15:1063-1070, 2004, incorporated by reference herein in its entirety.

According to various examples, the node 112 further comprises a synapse. The synapse is connected between an input of the node 112 and an input of the neuron and is configured to provide an input signal to the neuron. For example, the synapse may serve as an interface between a neuron of the first node 112 and a neuron of the second node 112 as part of the inter-nodal connection formed by selective activation of the switches 114 of the plurality. The interface, in turn, may serve to communicate signals transmitted from the neuron of the first node 112 via the formed inter-nodal connection into the neuron of the second node 112, for example.

According to some embodiments, the node 112 may have one synapse connected to provide an interface to the neuron. In other embodiments, the node 112 may comprise a plurality of synapses. For example, there may be four synapses in the node 112. In other embodiments, the number of synapses of the plurality may be greater than or fewer than four synapses. For example, the node 112 may have two, three, five or more synapses connected to one or more inputs of the neuron. Further, different nodes 112 in the neural fabric 110 may have different numbers of synapses as well as different numbers of synapses per neuron. For example, a first node 112 may have one synapse, a second node 112 may have four synapses 112, a third node 112 may have two synapses. As such, a number of synapses in a given node 112 may be arbitrary. In other embodiments, all nodes 112 of the neural fabric 110 may have substantially the same number of synapses per neuron.

Still further, more than one synapse may be connected to a particular input of the neuron in a node 112, according to some embodiments. For example, a first synapse and a second synapse may share a first input to the neuron while a third synapse may be connected to a second input of the neuron that is not shared with another synapse. However, each of the first, second and third synapses may be connected to a separate input of the node 112, for example. In other embodiments, each synapse is connected to a distinct and separate input of the neuron as well as to a separate and distinct input of the node 112.

According to various examples, the 'synapse', by definition herein, comprises a neuromorphic construct that mimics or emulates the neuro-biological characteristics of a biological synapse. In various examples, the synapse may comprise any of a number of neuromorphic constructs including, but not limited to, synapses based on CMOS circuitry. For example, the synapse may comprise CMOS circuitry and a learning module. The learning module may implement any of several different types of synaptic plasticity rules including, but not limited to, Hebbian plasticity, spike timing-dependent plasticity and short-term plasticity. In other embodiments, the synapse may be a software-based or a firmware-based synapse that, in whole or in part, employs a software simulation or a firmware simulation of the neuro-biological characteristics of the biological synapse (e.g., to implement one or both of synapse circuitry and the learning module). In a basic form, the synapse provides an interface between neurons. For example, the interface may merely translate signals from a received form to a form that is compatible with the neuron.

For example, the learning module of the synapse may be implemented as one or more of hardware, software and firmware, which implements a synaptic the spike timing dependent plasticity (STDP) learning rule. Such a synapse may be referred to as an STDP synapse. In some embodiments, the STDP synapse comprises a synapse core. The synapse core is configured to receive a pre-synaptic spike signal and to produce a weighted spike signal. In some embodiments, a pre-synaptic spike signal received by the synapse core is the pre-synaptic signal $V_{pre}$ provided by a pre-synaptic neuron (e.g., a neuron of a node 112). According to various examples, the weighted spike signal that is produced by the synapse core is weighted in accordance with a weight signal W(t) that is based on the STDP learning rule.

In some embodiments, the synapse core comprises a 1-bit digital-to-analog converter (DAC) with adjustable gain. In various examples, the 1-bit DAC has a signal input, a weight input and an output. The 1-bit DAC may be implemented using CMOS circuitry, for example. In some embodiments, the 1-bit DAC of the synapse core is configured to receive the pre-synaptic spike signal as a voltage spike train at the signal input. The 1-bit DAC is further configured to produce at the output the weighted spike signal. In some embodiments, the weighted spike signal is produced as a current spike train or equivalently, as a current-based spike signal.

According to various examples, the adjustable gain of the 1-bit DAC controls an amplitude value of spikes of the weighted spike signal. In particular, spikes in the weighted spike signal have timing that corresponds to timing of spikes in the pre-synaptic spike signal and have amplitude values that are adjusted according to the weight signal W(t). In examples where the weighted spike signal is produced as a current spike train, the current spikes of the current spike train have amplitude values determined by the adjustable gain according to the weight signal W(t).

According to some embodiments, the STDP synapse further comprises an STDP learning module. The STDP learning module has a first input to receive the pre-synaptic spike signal and a second input to receive a post-synaptic spike signal. In some embodiments, the pre-synaptic spike signal received at the first input comprises the pre-synaptic signal $V_{pre}$ provided by the pre-synaptic neuron. In some embodiments, the post-synaptic spike signal received at the second input comprises the post-synaptic spike signal $V_{post}$ provided by a post-synaptic neuron. The post-synaptic neuron may be the neuron of the node 112 that includes the STDP synapse, for example. The STDP learning module also has an output configured to produce the weight signal W(t). In some embodiments, the output of the STDP learning module is connected to the weight input of the 1-bit DAC of the synapse core. According to various examples, the STDP learning module implements the STDP learning model. In particular, the STDP learning module produces the weight signal W(t) according to the STDP learning module.

In some embodiments, the STDP learning module comprises a first gated signal path to integrate the pre-synaptic spike signal using a first leaky integrator, and comprises a second gated signal path to integrate the post-synaptic spike signal using a second leaky integrator. The STDP learning module further comprises an output integrator to integrate a difference between an output signal of the first gated signal path and an output signal of the second gated signal path. The integrated difference is the weight signal W(t). The first gated signal path is gated according to the post-synaptic spike signal and the second gated signal path is gated according to the pre-synaptic spike signal, according to various examples.

According to various examples, the plurality of switches 114 in FIG. 2 provide selectable pathways or connections between nodes 112 within the neural fabric 110, as noted above. In particular, closing one or more switches 114 of the neural fabric 110 establishes a link between an output of a neuron in a first node 112 and an input of a second node 112. The input may be an input of a synapse of the second node 112, for example. In various examples, a switch 114 of the plurality may be realized using any of a variety of technologies. For example, the switch 114 may comprise metal-oxide semiconductor (MOS) transistors that are configured to function as switches.

Figure 3:
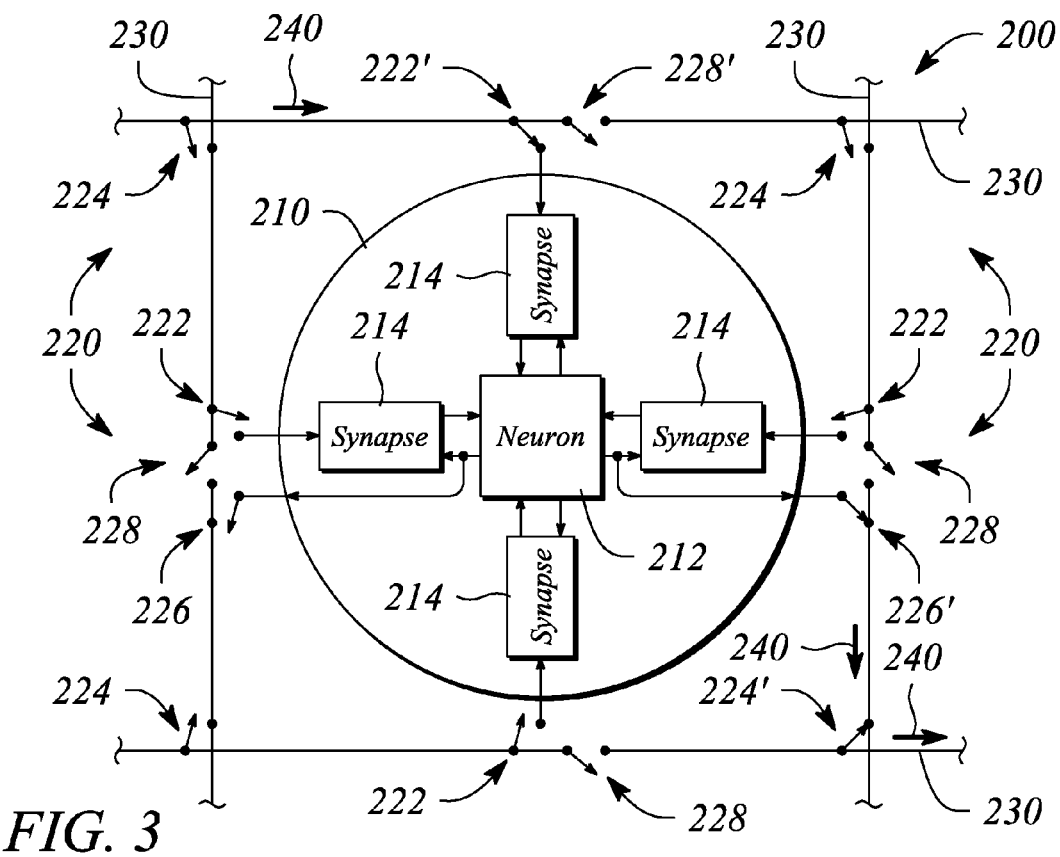
FIG. 3 illustrates a block diagram of a portion of a neural fabric, according to an embodiment consistent with the principles of the present invention.

FIG. 3 illustrates a block diagram of a portion of a neural fabric 200, according to an embodiment consistent with the principles of the present invention. In some embodiments, the neural fabric 200 may be substantially similar to the neural fabric 110 of the STM neuromorphic network 100, described herein. In particular, FIG. 3 illustrates a node 210 of the neural fabric 200. The node 210 comprises a neuron 212 surrounded by a plurality of synapses 214. Specifically as illustrated, the neuron 212 of the node 210 is surrounded by four synapses 214, by way of example and not limitation. In some embodiments, each of the synapses 214 is connected between an input of the node 210 and an input of the neuron 212. An output of the neuron 212 is connected to an output of the node 210 (e.g., illustrated at two places). In addition, the neuron output may be connected to another input of each of the synapses 214, in some examples (e.g., as illustrated).

In some embodiments, the synapse inputs that are connected to the respective node inputs may receive a pre-synaptic signal from another node 210 (not illustrated in FIG. 3) in the neural fabric 200. The inputs of the synapses 214 that are connected to the neuron 212 may receive a post-synaptic signal from the neuron 212. For example, when the synapses 214 are STDP synapses, the pre-synaptic signal may be the pre-synaptic signal $V_{pre}$ and the post-synaptic signal may be the post-synaptic spike signal $V_{post}$, described above with respect to the STDP learning module and STDP synapse.

Further illustrated in FIG. 3 is a plurality of switches 220. The plurality of switches 220 may be substantially similar to the plurality of switches 114 of the neural fabric 110, described above with respect to the STM neuromorphic network 100, according to some embodiments. In some embodiments, the plurality of switches 220 may comprise a node input switch 222 configured to selectively connect an adjacent signal path 230 to an input of the node 210. The signal path 230 may be a wire, a transmission line or a member of a signal transmission channel, according to various examples. As illustrated, the node 210 has four node input switches 222, one for each of four inputs to the node 210, for example. Selective activation of the node input switch 222' facilitates routing a signal 240 on the adjacent signal path 230 into the input of the node 210 and to a synapse 214 of the node 210. The signal 240 may be an output signal produced by a neuron 212 of the node 210, as described further below.

In some embodiments, the plurality of switches 220 further comprises a diagonal switch 224. The diagonal switch 224 facilitates routing the signal 240 from a first signal path 230 to a second signal path 230. The first and second signal paths 230 may be substantially orthogonal to one another and cross each other in a vicinity of the diagonal switch 224, for example. When selective activation closes the diagonal switch 224', a connection may be formed between the first and second signal paths 230 allowing a signal to propagate from the first signal path 230 to the second signal path 230, for example.

In some embodiments, the plurality of switches 220 further comprises a node output signal switch 226. The node output signal switch 226 facilitates connecting an output of the node 210 to the signal path 230. In particular, when the node output signal switch 226' is closed, the signal 240 produced by a neuron 212 of the node 210 may be communicated to the signal path 230. The communicated signal 240 may be carried to and received by another node 210 of the neural fabric 200 by way of the signal path 230 and the node input switch 222 in cooperation with one or more diagonal switches 224, for example. Note that, for example, FIG. 3 illustrates switches 220 of the plurality that are activated, including a closed node input switch 222', a closed node output switch 226', and a closed diagonal switch 224'. When open, the switches are respectively referred to in FIG. 3 as switches 222, switches 226 and switches 224, for example. Collectively, the activated switches 220 transmit the signal 240 into and out of the node 210, as illustrated in FIG. 3.

In some embodiments, the plurality of switches 220 further comprises a signal path switch 228. The signal path switch 228 may facilitate the selective termination or continuation of the signal path 230 at a particular node 210. In particular, opening the signal path switch 228 may break the signal path 230 at a particular node to prevent the signal 240 from propagating further down the signal path 230. Alternatively, a closed signal path switch 228' continues the signal path 230. Alternatively, closing the signal path switch 228 facilitates further propagation of the signal 240 to more than one node 210, for example.

In some embodiments, the nodes 210 of the neural fabric 200 are arranged in a two dimensional (2-D) array of nodes 210 (not illustrated). In some embodiments, the neural fabric 200 further comprises a plurality of signal routing channels. For example, the signal routing channels may be interspersed in between nodes 210. The interspersed signal routing channels may form a grid such that the signal routing channels substantially surround or bound nodes 210 of the 2-D array on four sides. The switches 220 (e.g., the node input switches 222 and the node output switches 226) may connect between the signal routing channels and the nodes 210, in some embodiments. The connection provided by the switches 220 may facilitate communicating signals 240 into and out of the nodes 210. For example, the signal routing channels may comprise the signal paths 230 that are illustrated in FIG. 3.

Figure 4A:
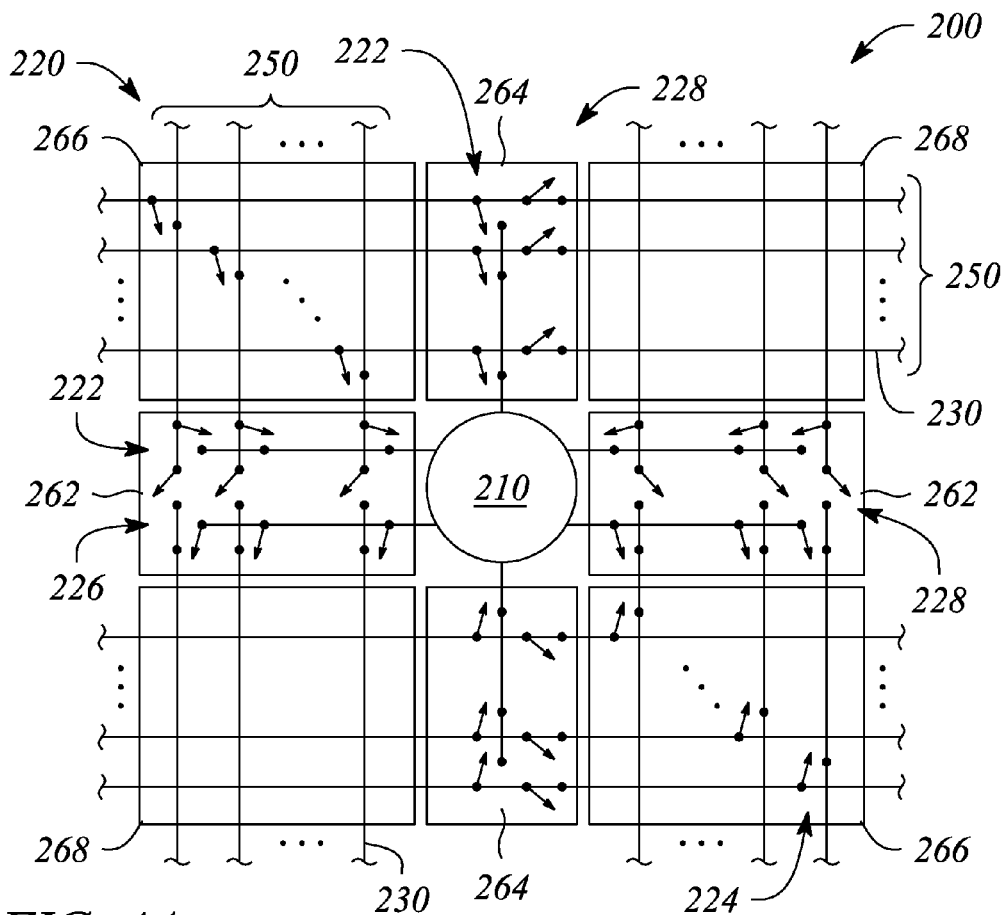
FIG. 4A illustrates a block diagram of a portion of a neural fabric, according to another example consistent with the principles described herein.
Figure 4B:
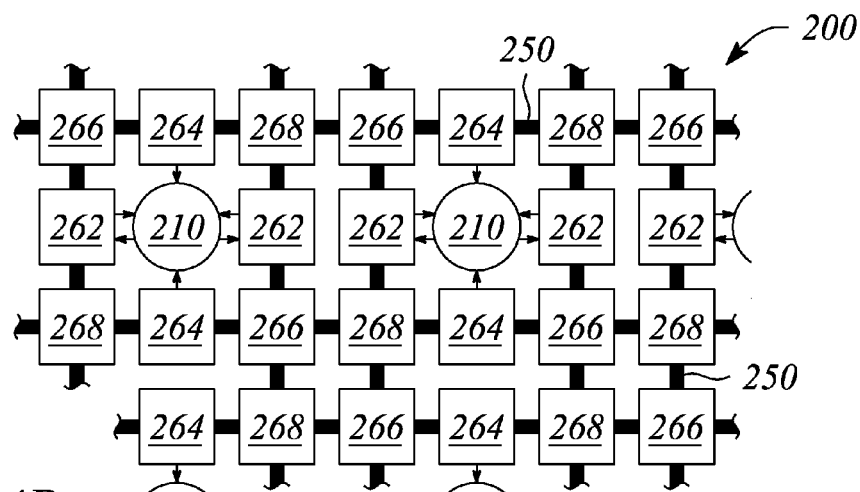
FIG. 4B illustrates a block diagram of a portion of a neural fabric that includes the portion illustrated in FIG. 4A, according to an embodiment consistent with the principles of the present invention.

FIG. 4A illustrates a block diagram of a portion of a neural fabric 200, according to another example consistent with the principles described herein. FIG. 4B illustrates a block diagram of a portion of a neural fabric 200 that includes the portion illustrated in FIG. 4A, according to an embodiment consistent with the principles of the present invention. In some embodiments, the neural fabric 200 may be substantially similar to the neural fabric 110 of the STM neuromorphic network 100, described above. In particular, FIG. 4A illustrates a single node 210 and a portion or subset of the plurality of switches 220 of the neural fabric 200. FIG. 4B illustrates a portion of the plurality of nodes 210 as well as blocks containing the plurality of switches 220 (not illustrated in FIG. 4B) in which the nodes 210 are arranged in a 2-D array. As illustrated, the nodes 210 are bounded on four sides by signal routing channels 250. A signal routing channel 250 comprises a plurality of substantially parallel signal paths 230. The signal routing channels 250 bound the nodes 210, or are adjacent to the nodes 210 on a side and are configured to carry or route signals 240 within the signal paths 230 between the nodes 210. The signals 240 are routed according to a configuration or a switch state of the switches 220 established by selective activation thereof. As illustrated in FIGS. 4A and 4B, the signal routing channels 250 are arranged in horizontal signal routing channels 250 and vertical signal routing channels 250 by way of example.

As illustrated, the switches 220 and the signal routing channels 250 in a vicinity of a node 210 may be divided into eight blocks. The eight blocks include left and right input/output (I/O) blocks 262, top and bottom input blocks 264, top-left and bottom-right diagonal blocks 266, and top-right and bottom-left wire blocks 268. As illustrated in FIG. 4B, respective ones of the eight blocks 262, 264, 266 and 268 of the neural fabric 200 are interconnected to one another by signal routing channels 250. Some of the eight blocks are connected to nodes 210 via others of the eight blocks.

As illustrated in FIG. 4A, each of the left I/O block 262 and the right I/O block 262, for example, comprises a node input switch 222 configured to selectively connect the signal routing channel 250 to an input of the node 210. In some embodiments, there may be as many node input switches 222 in an I/O block 262 as there are separate signal paths 230 in the signal routing channel 250. Each of the left and the right I/O blocks 262 may connect to a different one of a plurality of inputs of the node 210, for example. Further, as illustrated, each of the left and right I/O blocks 262 comprises a node output switch 226 to selectively connect an output of the node 210 to a signal routing channel 250, or to a signal path 230 of the routing channel 250, for example. In some embodiments, there may be as many node output switches 226 in an I/O block 262 as there are signal paths 230 in the signal routing channel 250. Each of the left and the right I/O blocks 262 may connect to a different one of a plurality of output ports of the node 210, for example. As illustrated in FIG. 4A, the left and right I/O blocks 262 connect the node inputs and the node outputs to respective ones of two vertical signal routing channels 250 to a left and a right of the node 210. The left and the right I/O blocks 262 may further comprise a signal path switch 228, for example as illustrated.

Further as illustrated in FIG. 4A, each of the top input block 264 and the bottom input block 264, for example, comprises a node input switch 222 configured to selectively connect a respective signal routing channel 250 to an input of the node 210. As with the left and right I/O blocks 262, the top and bottom input blocks 264 have as many node input switches 222 as there are separate signal paths 230 in the signal routing channel 250, in some embodiments. Likewise, each of the top and bottom input blocks 264, for example, may be connected to a different input of the node 210 (e.g., a different one of four inputs, as illustrated). In some embodiments (not illustrated), the top and bottom input blocks 264 may be I/O blocks and include node output switches connected to outputs of the node 210. As illustrated in FIG. 4A, the top and bottom input blocks 264 connect the node inputs to respective ones of two horizontal signal routing channels 250 above and below the node 210. The top and the bottom input blocks 264 may further comprise a signal path switch 228, for example as illustrated.

Further as illustrated in FIG. 4A, in some embodiments, each of the top-left diagonal block 266 and the bottom-right diagonal block 266, comprises one or more diagonal switches 226 to selectively connect a first signal routing channel 250 to a substantially orthogonal second signal routing channel 250. In particular, the diagonal switches of the diagonal blocks 266 illustrated in FIG. 4A provide a selectable connection between the vertical and horizontal signal routing channels 250 that surround the node 210. In some embodiments, there may be as many diagonal switches 224 in each diagonal block 266 as there are signal paths 230 in the first and second signal routing channels 250. As illustrated FIGS. 4A and 4B, there are two (i.e., top-left and bottom-right) diagonal blocks 266 associated with every node 210 in the neural fabric 200. The two diagonal blocks 266 facilitate routing signals from the horizontal signal routing channel 250 to the vertical signal routing channel 250 and from the vertical signal routing channel 250 to the horizontal signal routing channel 250. In other embodiments, there may fewer (e.g., one) or more (e.g., three or four) diagonal blocks 266. As further illustrated in FIG. 4A, each of the top-right wire block 268 and the bottom left wire block 268 comprises overlapping vertical signal paths 230 and horizontal signal paths 230 of the respective signal routing channels 250, but otherwise provide no connection therebetween, in some embodiments.

Referring again to FIG. 2, the STM neuromorphic network 100 further comprises a neuromorphic controller 120. The neuromorphic controller 120 is configured to sequentially form subsets of a set of the inter-nodal connections within the STM neuromorphic network 100, wherein the set of inter-nodal connections represents a fully connected neural network. The fully connected neural network may be a neural network that the STM neuromorphic network 100 is programmed to implement, for example. In some embodiments, each subset is formed during a different time slot of a plurality of time slots of a cycle of the STM neuromorphic network 100. When combined, the inter-nodal connection subsets formed during the STM neuromorphic network cycle implements the fully connected neural network by time multiplexing the plurality of inter-nodal connections.

In some embodiments, the STM neuromorphic network 100 further comprises a switch state memory 130. The switch state memory 130 is configured to store a switch state of the plurality of switches 114. For example, the switch state memory 130 may store a state of each of the switches 114 corresponding to each time slot of the cycle. The switch state may define which switches 114 of the plurality are open and which switches 114 of the plurality are closed during a particular time slot, for example. The neuromorphic controller 120 may access the switch state memory 130 during each time slot to retrieve the switch state for the respective time slot. The neuromorphic controller 120 may then use the retrieved switch state to activate the switches 114 accordingly to establish which switches 114 are open and which are closed, for example. Sequential retrieval and use of the switch states enable the neuromorphic controller 120 to time multiplex the plurality of inter-nodal connections through the STM neuromorphic network cycle, according to various examples. In some embodiments, the switch state memory 130 may comprise a digital memory (e.g., a computer memory).

In some embodiments, the STM neuromorphic network 100 further comprises a synapse conductance state memory 140. The synapse conductance state memory 140 is configured to store a synapse conductance state of a synapse of a node 112. For example, the synapse conductance state memory 140 may store conductance settings or states of each synapse in each node 112 of the STM neuromorphic network 100. Moreover, different conductance states for each synapse may be stored for or correspond to each time slot of the STM neuromorphic network cycle. In some embodiments, the conductance state may correspond to a weight signal W(t) for a synapse learning module of the synapse (e.g., an SDTP learning module of an SDTP synapse). In some embodiments, the synapse conductance state memory 140 comprises an analog memory that stores analog values. In other embodiments, the synapse conductance state memory 140 comprises a digital memory that store the conductance states as digital values. The digital values may be transformed into analog values, for example using a digital to analog converter (DAC), when retrieved during a time slot, in some embodiments.

As illustrated in FIG. 2, the STM neuromorphic network 100 may further comprise a neuromorphic compiler 150, according to some embodiments. The neuromorphic compiler 150 is configured to convert a description of the fully connected neural network into an STM compatible routing schedule, in some embodiments. In particular, the STM compatible routing schedule is configured to assign the nodes 112 to different ones of the time slots of the STM neuromorphic network cycle and to provide connection routing between the assigned nodes 112 during the time slots of the STM neuromorphic network cycle, according to various examples. For example, the STM compatible routing schedule may establish which nodes are interconnected during each of the time slots to insure that the fully connected neural network is realized during each STM neuromorphic network cycle.

In some embodiments, the neuromorphic compiler 150 is further configured to provide connection routing verification. In some embodiments, the neuromorphic compiler 150 is configured to provide connection routing verification by comparing a binary image of the connection routing in the time slots to a binary image created from the description of the fully connected neural network. Both routing and routing verification are described in more detail below.

Figure 5:
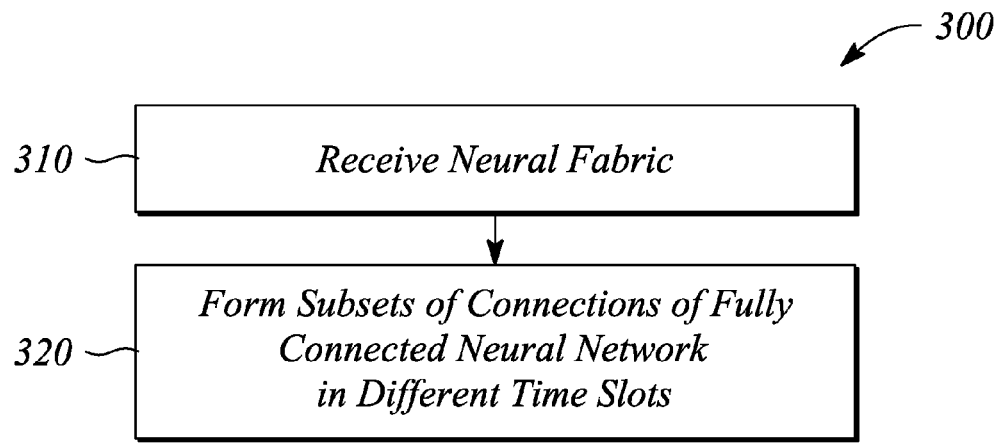
FIG. 5 illustrates a flow chart of a method of synaptic time multiplexing a neuromorphic network, according to an embodiment consistent with the principles of the present invention.

FIG. 5 illustrates a flow chart of a method 300 of synaptic time multiplexing a neuromorphic network, according to an embodiment consistent with the principles of the present invention. The method 300 of synaptic time multiplexing comprises receiving 310 a neural fabric. According to various examples, the received 310 neural fabric comprises a plurality of neurons and associated synapses selectively interconnected by a plurality of switches. Selective switch activation defines a connection between an output of a first neuron and a synapse connected to an input of a second neuron of the neural fabric, in various examples. In some embodiments, the received 310 neural fabric is substantially similar to the neural fabric 110 described above with respect to the STM neuromorphic network 100.

The method 300 of synaptic time multiplexing a neuromorphic network further comprises forming 320 subsets of a plurality of connections representing a fully connected neural network within the neural fabric. According to various examples, the subsets are formed 320 using selective switch activation. Further, according to various examples, each subset is formed 320 sequentially during a different time slot of a plurality of time slots of a synaptic time multiplexing cycle of the neuromorphic network. A combination of the sequentially formed connection subsets implements the fully connected neural network by time multiplexing the synapses. In some embodiments, forming 320 may be performed by a neuromorphic controller that is substantially similar to the neuromorphic controller 120 described above with respect to the STM neuromorphic network 100.

In some embodiments, the neuromorphic network further comprises a switch state memory to store a switch state of the plurality of switches and a synapse conductance state memory to store a synapse conductance state of the plurality of associated synapses. In some embodiments, the switch state memory may be substantially similar to the switch state memory 130 described above with respect to the STM neuromorphic network 100. In some embodiments, the synapse conductance state memory is substantially similar to the synapse conductance state memory 140 described above with respect to the STM neuromorphic network 100.

In some embodiments in which the neuromorphic network comprises the switch state memory, the method 300 of synaptic time multiplexing further comprises retrieving a stored switch state from the switch state memory. For example, the stored switch state may be retrieved during a time slot of the synaptic time multiplexing cycle. The stored switch state that is retrieved corresponds to the time slot, according to various examples.

In some embodiments in which the neuromorphic network comprises the synapse conductance state memory, the method 300 of synaptic time multiplexing further comprises retrieving a stored synapse conductance state from the synapse conductance state memory. For example, the stored synapse conductance state may be retrieved during a time slot of the synaptic time multiplexing cycle. The stored synapse conductance state that is retrieved corresponds to the time slot, according to various examples.

In some embodiments, the method 300 of synaptic time multiplexing further comprises using the retrieved switch state to set the switches of the plurality of switches during the time slot. For example, the retrieved switch state may be used to open and close various one of the switches of the neural fabric to establish connections between neurons and synapses dictated by the subset of connections corresponding to the time slot. In some embodiments, the method 300 of synaptic time multiplexing further comprises using the retrieved synapse conductance state to set a synapse of the plurality of associated synapses during the time slot. For example, the retrieved synapse conductance state may be used to set a value of an output (e.g., a weight signal or value) of a learning module of the synapse.

In particular, in some embodiments, one or more synapses of the neural fabric may provide spike timing dependent plasticity (STDP). In these examples, using the retrieved conductance state may comprise updating the synapse conductance state of the synapse according to a spike timing dependent plasticity rule during the time slot. Using the retrieved conductance state may further comprise storing the updated synapse conductance state in the synapse conductance state memory. Updating and storing may be performed during the time slot, in some embodiments. In other embodiments, updating may be performed just before the time slot and storing may be performed just after the time slot.

In some embodiments, the method 300 of synaptic time multiplexing further comprises converting a description of the fully connected neural network into an STM compatible routing schedule. In some embodiments, the STM compatible routing schedule is configured to assign the neurons and the associated synapses to different ones of the time slots of the synaptic time multiplexing cycle of the neuromorphic network and to provide connection routing between the assigned neurons and associated synapses during the time slots. In some embodiments, the description of the fully connected neural network is provided by a neuromorphic compiler. The neuromorphic compiler may be substantially similar to the neuromorphic compiler 150 described above with respect to the STM neuromorphic network 100, for example. In some embodiments, the method 300 of synaptic time multiplexing further comprises providing connection routing verification by comparing a binary image of the connection routing in the time slots to a binary image created from the description of the fully connected neural network. Both of converting the description of the fully connected neural network and routing verification are described in more detail below.

Figure 6:
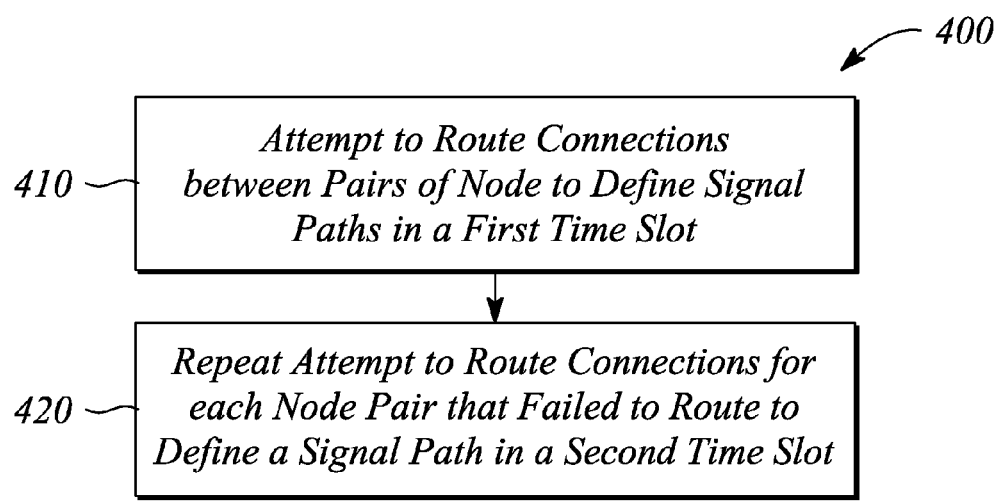
FIG. 6 illustrates a flow chart of a method of scalable routing of connections in a synaptic time-multiplexed (STM) neuromorphic network, according to an embodiment consistent with the principles of the present invention.

FIG. 6 illustrates a flow chart of a method 400 of scalable routing of connections in a synaptic time-multiplexed (STM) neuromorphic network, according to an embodiment consistent with the principles of the present invention. Among the goals of scalable routing of the method 400 is to discover or define a path that connects an output of a neuron in a presynaptic node to an input (e.g., physical synapse) of a postsynaptic node for each pair of nodes in a fully connected neural network. In various examples, the path comprises identified signal paths in signal routing channels along with particular switch states to provide the connection (i.e., which switches in the path should be turned ON and OFF to form the path).

The method 400 of scalable routing substantially solves a 'one-to-many' routing problem that routes signals from a presynaptic node to one or more postsynaptic nodes. In particular, each presynaptic node may be connected to one or more postsynaptic nodes. A 'fan-out' defines a maximum number of postsynaptic nodes that can be connected to and driven by a single presynaptic node at any given time. Hardware implementations may determine the fan-out, for example. However, each synapse of a postsynaptic node cannot be connected to more than one presynaptic node output, by definition herein. Hence, a 'fan-in' for each postsynaptic node is substantially equal to one, for various examples. Further, the method 400 of scalable routing assigns synapses or equivalently connections between pairs of nodes to particular time slots of the synaptic time multiplexing cycle.

As illustrated in FIG. 6, the method 400 of scalable routing comprises attempting 410 to route connections between pairs of nodes of a fully connected neural network. A successfully routed connection defines a signal path between the pair of nodes in a first time slot of the STM neuromorphic network. In various examples, attempting 410 to route connections employs a routing algorithm to discover or determine signal paths within signal routing channels within a neural fabric of the STM neuromorphic network. Further, attempting 410 to route connections establishes switch states of the neural fabric to realize the signal path of the successfully routed connection between nodes of the pair.

The method 400 of scalable routing further comprises repeating 420 an attempt to route connections of the fully connected neural network for each node pair for which attempting 410 to route connections failed to produce a defined signal path between the nodes of the pair. According to various examples, repeating 420 is performed by ignoring any signal paths that were previously defined by attempting 410 to route connections. A successfully routed connection produced by repeating 420 an attempt to route connections defines a signal path between nodes in a second time slot of the STM neuromorphic network. As with attempting 410 to route connections, repeating 420 an attempt to route connections employs a routing algorithm and establishes switch states of the neural fabric to realize the signal path of the successfully routed connection between nodes of the pair.

In some embodiments, the method 400 of scalable routing employs and is performed on a neural fabric having a configuration in which portions of the neural fabric surrounding and associated with each node are divided into eight blocks, as is illustrated for the neural fabric 200 in FIGS. 4A and 4B, for example. For example, the eight blocks associated with each node may comprise the various subsets of switches or combinations thereof of the neural fabric along with portions of signal routing channels that surround the nodes. The signal routing channels pass through various ones of the eight blocks carrying signal paths (e.g., horizontal and vertical signal paths 230), for example. According to various examples, the switches in the eight blocks provide selectable routing of signals in the signal paths.

According to various examples, the method 400 of scalable routing substantially comprises finding a path from an output of a node to an input of another node in the neural fabric. With reference to FIG. 4B, the path may be from one of the node I/O blocks 262 of a first or presynaptic node (e.g., to a left and a right of the presynaptic node 210) to a node I/O block 262 of a second or postsynaptic node. With reference to FIGS. 4A and 4B, the method 400 of scalable routing attempts to find paths through the neural fabric 200 for each connection of the fully connected neural network employing available signal routing channels 250, signal paths 230 and switches 220.

According to some embodiments, the method 400 of scalable routing may employ a routing algorithm such as, but not limited to, an A* search algorithm. The A* search algorithm comprises using a best-first search to find a least-cost path between nodes. In various examples, the A* search algorithm attempts to minimize a cost function c(p) representing a cost of a path from a predetermined starting point to a current point or location p. For example, the starting point may be a presynaptic node or neuron and the current location p may be a point on a path from the presynaptic node in the neural fabric. As the A* search algorithm progresses, the current location p ultimately reaches a postsynaptic node and the path discovered or determined by the A* search algorithm defines a signal path from a presynaptic node to the postsynaptic node.

In the A* search algorithm, the cost function c(p) may be given as a sum of a path cost function g(p) and a heuristic estimate function h(p). The path cost function g(p) is a cost of a current path (e.g., a length) from the starting point (e.g., the presynaptic node) to the current location p. The heuristic estimate function h(p) provides an estimate of a cost (e.g., a length) from the current location p to the goal location (e.g., the postsynaptic node). Any of a variety of cost functions including, but not limited to, a Manhattan distance may be employed for one or both of the path cost function g(p) and the heuristic estimate function h(p), according to various examples of using the A* search algorithm to route signal paths in the neural fabric.

In some embodiments, there may be no advantage to finding a true shortest path for all of the connections of the neural network. In particular, finding a set of shortest paths in a 'reasonable' processing time may be more useful. In these examples, routing may try a slightly higher cost 'go-around' when encountering an obstacle along a partial path prior to examining other partial paths having a same cost in the queue of the A* search algorithm. For example, the cost function of the A* search may be modified from that described above to include an uncertainty factor u as give by equation (1)

$$c(p) = g(p) + u \cdot h(p) \qquad (1)$$

where the uncertainty factor u is chosen to control a performance of the A* search algorithm. For example, when the uncertainty factor u is chosen to be a small positive number (e.g., $0 < u < 1$), a less circuitous partial path will have a relatively smaller cost than a more circuitous partial path and the A* search algorithm will tend to behave as a breadth-first search (BFS). On the other hand, when the uncertainty factor u is chosen to be a very large number (e.g., $u \gg 1$), a circuitous partial path will have a relatively smaller cost than a less circuitous path and the A* search algorithm operates substantially similar to a depth first search (DFS). The A* search algorithm that behaves as the BFS tends to spend time expanding unsuccessful partial paths before trying higher cost paths around an obstacle, while the A* search algorithm having DFS tendencies generally spends more time exploring dead-end paths before getting back on a right track. However, when the uncertainty factor u is chosen to be slightly larger than one (e.g., $1 < u < 2$), the A* search algorithm exhibits only weak DFS tendencies. For example, a choice of the uncertainty factor u between about 1.2 and 1.3 may result in the A* search algorithm in a reasonable balance between BFS and DFS tendencies during routing.

In some embodiments, the uncertainty factor u may increases with a probability of encountering an obstacle. For example, as paths increase in length during routing, the uncertainty factor u may be gradually increased. Increasing the uncertainty factor u as a function of relative distance between nodes or ranking may ensure that shorter distances produce shortest paths while longer distances are routed in a reasonable processing time.

In other embodiments, a maximum number of partial paths may be limited to a relatively small number. For example, the maximum number of partial paths may be limited to less than 100. The maximum number of partial paths may be about 50-75, for example. In another example, the maximum number of partial paths may be limited to less than about 200-300. When the maximum number is exceeded, the attempt to route the connection may be terminated early and the connection may be flagged as a failed connection. Failed connections may be shifted to another time slot for another attempt at routing (e.g., during repeating 420 an attempt to route), for example.

In some embodiments, the method 400 of scalable routing substantially determines the paths in the neural fabric that define the connections of the fully connected neural network on a one-by-one basis for each pair of nodes using the routing algorithm (e.g., the A* search algorithm). In some embodiments, paths are determined for pairs of nodes that are ranked in an ascending order based on the Manhattan distance between the nodes. In particular, the method 400 of scalable routing further comprises ranking node pairs of the fully connected neural network according to a relative distance between the nodes in each of the pairs, according to some embodiments. The attempting 410 to route connections and the repeating 420 an attempt to route connections is then performed on the set of node pairs in an order based on the ranking.

In particular, the Manhattan distance between each pair of nodes of the neural network is determined during the relative distance ranking. The determined Manhattan distance is then used to rank the pair of nodes relative to distances of other pairs of nodes. The ranked node pairs are arranged in ascending order and routing is applied to determine a path between the nodes beginning with the lowest ranked node pair (i.e., nodes separated by a shortest Manhattan distance) and proceeding sequentially to a highest ranked pair of nodes (i.e., a node pair having a longest Manhattan distance). In some embodiments, a queue of the A* search algorithm is managed as a last-in-first-out (LIFO) manner for a partial path cost and the A* search algorithm may behave substantially similar to the depth-first search (DFS).

In some embodiments, the method of scalable routing may be represented as pseudocode given by:

```
S ← {(n₁,n₂)| pairs of pre- and post-synaptic neurons}
While S ≠ ∅        // minimum number of time slots based on fan-in and
                      fan-out of neuron implementation
  minTimeslot ← max( max( count(s==(*,nⱼ))/fan-in where s ∈ S and
    i = [1,# of neurons] ), max( count(s==(nⱼ, *))/fan-out where s ∈ S
    and j = [1,# of neurons] ) )
  S ← sort S by ascending order of Manhattan distance between pre-
    and post-synaptic neurons
  ST ← {STᵢ | pairs of pre- and post-synaptic neurons assigned to
    timeslot i,
    STᵢ ⊂ S, i = [1, minTimeslot] }
  F ← ∅
  Foreach STᵢ ∈ ST
    STᵢ ← sort STᵢ by ascending order of Manhattan distance
    Foreach sⱼ ∈ STᵢ  // sⱼ = {synapses from common pre-synaptic
      neuron j}
      find shortest paths with available lanes for sⱼ using A*
      if found
        assign available lanes to sⱼ
      else
        F ← F ∪ sⱼ
    End Foreach
  End Foreach
  S ← F
Endwhile
``` where S and F are sets of paths s, ST is a set of paths in timeslots, $ST_k$ is a set of paths assigned to a k-th timeslot, 'lanes' may comprise signal routing channels, and ∅ represents a null set.

Figure 7:
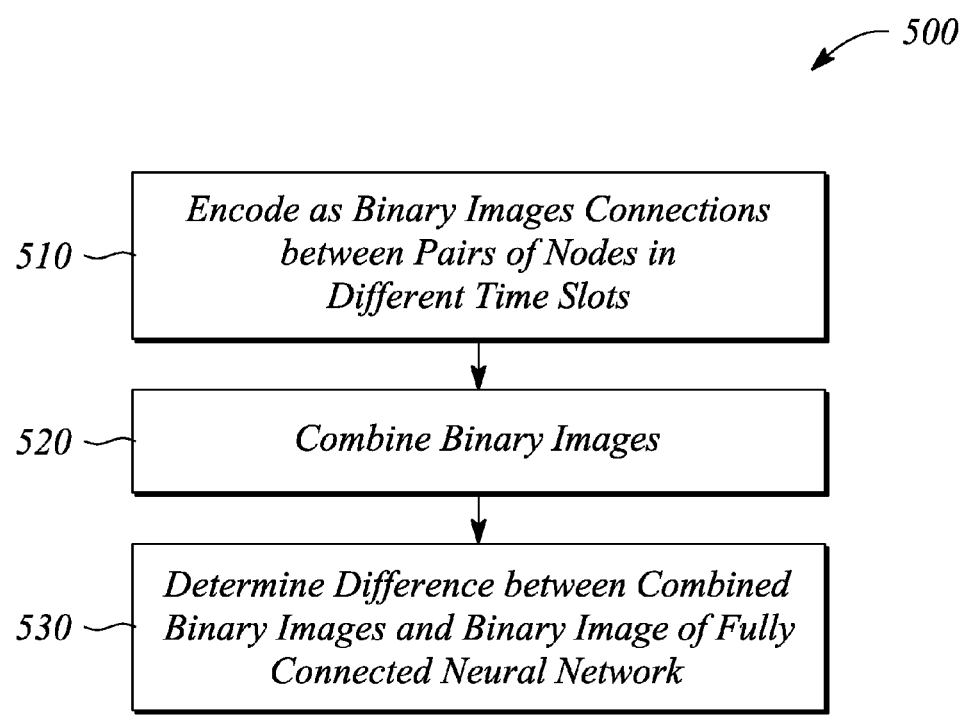
FIG. 7 illustrates a flow chart of a method of verifying connection routing in a synaptic time-multiplexed (STM) neuromorphic network, according to an embodiment consistent with the principles of the present invention.

FIG. 7 illustrates a flow chart of a method 500 of verifying connection routing in a synaptic time-multiplexed (STM) neuromorphic network, according to an embodiment consistent with the principles of the present invention. The method 500 of verifying connection routing comprises encoding 510 as a plurality of binary images connections between pairs of nodes in a neural fabric of the STM neuromorphic network. The binary images of the plurality represent node pair connections in different time slots of the STM neuromorphic network. For example, each time slot of the STM neuromorphic network is represented by a different binary image of the plurality after encoding 510. Further, the connections represented by the binary images of the plurality are connections that were discovered or determined by a routing algorithm, e.g., the method 400 of scalable routing, described above.

In some embodiments, encoding 510 as a plurality of binary images comprises turning ON a pixel of a binary image of the plurality to represent a connection between nodes of a pair corresponding to the pixel. For example, each pixel may have a location in the binary image specified by a row index and a column index. The pixel row index may correspond to a presynaptic node of the pair and the pixel column index may correspond to a postsynaptic node of the pair, for example. In an example, a connection between a presynaptic node numbered '25' in the neural fabric and a postsynaptic node numbered '12' may correspond to a pixel in the binary image at row 25 and column 12 (e.g., $P_{25,12}$), and may be represented by the pixel $P_{25,12}$ being turned ON. An 'ON' pixel may be black while an OFF pixel may be white, for example. In another example, a pixel $P_{33,42}$ in the binary image is turned ON to indicate a connection between a node pair with a presynaptic node numbered '33' and a postsynaptic node numbered '42'.

The method 500 of verifying connection routing further comprises combining 520 the binary images of the plurality. Combining 520 the binary images is configured to produce a combined time slot image from all of the binary images of the plurality. The combined time slot image is also a binary image, according to various examples. Combining 520 the binary images may be performed by adding the binary images together. A logical OR may be used to add the binary images together, for example. The binary images can be added together since the routing used to specify the connections between node pairs in each of the time slot does not assign a given connection in more than one time slot, according to various examples.

The method 500 of verifying connection routing further comprises determining 530 a difference between the combined time slot image (i.e., the combined 520 binary images) and a binary image created using connections of the fully connected neural network. Creating the binary image using the fully connected neural network may be performed by encoding connections of a connection matrix of the fully connected neural network in a manner that is substantially similar to the encoding 510 used to produce the plurality of binary images representing the connections of the various STM neuromorphic network time slots. A zero difference between the combined time slot image and the image created using connections of the fully connected neural network verifies the connection routing. Conversely, any difference other than zero indicates a failure of connection routing (i.e., an error in routing) that produced the connections represented by the binary images of the plurality. Moreover, the determined 530 difference may indicate which connections were not routed by the failed routing. In some embodiments, a Hamming difference is used to determine 530 the difference between the combined time slot image and the binary image created using connections of the fully connected neural network.

Thus, there have been described examples of a synaptic time-multiplexed (STM) neuromorphic network and a method of synaptic time multiplexing as well as examples of a scalable method of routing connections and a method of verifying the connection routing in the STM neuromorphic system. It should be understood that the above-described examples are merely illustrative of some of the many specific examples that represent the principles consistent with the principles described herein. Clearly, those skilled in the art can readily devise numerous other arrangements without departing from the scope consistent with the principles described herein as defined by the following claims.

What is claimed is:

1. A synaptic time-multiplexed (STM) neuromorphic network comprising:
   a neural fabric having nodes and switches to define inter-nodal connections between selected nodes of the neural fabric; and
   a neuromorphic controller to form subsets of a set of the inter-nodal connections representing a fully connected neural network, each subset being formed during a different time slot of a plurality of time slots of a time multiplexing cycle of the STM neuromorphic network, wherein in combination, the inter-nodal connection subsets implement the fully connected neural network.

2. The STM neuromorphic network of claim 1, wherein a node of the neural fabric comprises a neuron and a synapse, an output of the neuron being connected to an output of the node, the synapse being connected between an input of the node and an input of the neuron to provide an input signal to the neuron.

3. The STM neuromorphic network of claim 2, wherein the node comprises a plurality of synapses, each synapse of the plurality of synapses being connected between the neuron and a different one of a plurality of inputs of the node.

4. The STM neuromorphic network of claim 3, wherein the plurality of synapses comprises four synapses.

5. The STM neuromorphic network of claim 2, wherein the synapse is configured to implement spike timing dependent plasticity, the synapse having an input connected to the input of the node and an input connected to an output of the neuron.

6. The STM neuromorphic network of claim 1, wherein the nodes of the neural fabric are arranged in a two dimensional (2-D) array of nodes, the neural fabric further having a plurality of signal routing channels, the nodes being bounded on four sides by the signal routing channels, and wherein some of the switches of the neural fabric connecting between the signal routing channels and the nodes to facilitate communicating signals into and out of the nodes.

7. The STM neuromorphic network of claim 6, wherein the neural fabric associated with a node is divided into blocks comprising:
a input/output (I/O) block having an input switch to selectively connect a signal routing channel to an input of the node and an output switch to selectively connect an output of the node to the signal routing channel; and
a diagonal block having a switch to selectively connect a first signal routing channel to a substantially orthogonal second signal routing channel.

8. The STM neuromorphic network of claim 1, further comprising:
a switch state memory to store a switch state of the switches; and
a synapse conductance state memory to store a synapse conductance state of a synapse of a node of the neural fabric,
wherein the stored switch state and the stored synapse conductance state correspond to a time slot of the plurality of time slots of the time multiplexing cycle of the STM neuromorphic network.

9. The STM neuromorphic network of claim 1, further comprising a neuromorphic compiler, the neuromorphic compiler to convert a description of the fully connected neural network into an STM compatible routing schedule, the STM compatible routing schedule to assign the nodes to different ones of the time slots of the plurality and to provide connection routing between the assigned nodes during the different time slots.

10. The STM neuromorphic network of claim 9, wherein the neuromorphic compiler is further configured to provide connection routing verification by comparing a binary image of the connection routing in the different time slots to a binary image created from the description of the fully connected neural network.

11. A method of synaptic time multiplexing a neuromorphic network, the method comprising:
receiving a neural fabric of the neuromorphic network, the neural fabric comprising a plurality of neurons and associated synapses interconnected by a plurality of switches, selective switch activation defining a connection between an output of a first neuron and a synapse connected to an input of a second neuron of the neural fabric;
forming subsets of a set of connections representing a fully connected neural network within the neural fabric using the selective switch activation, each subset being formed sequentially during a different time slot of a plurality of time slots of a synaptic time multiplexing cycle of the neuromorphic network,
wherein the sequentially formed connection subsets in combination implement the fully connected neural network.

12. The method of synaptic time multiplexing of claim 11, wherein the neurons and associated synapses of the neural fabric are arranged in a two dimensional (2-D) array of nodes, each node comprising a neuron and a plurality of associated synapses, and wherein the neural fabric further comprises a plurality of signal routing channels, each node being bounded on a side by a signal routing channel of the plurality.

13. The method of synaptic time multiplexing of claim 11, wherein the neuromorphic network further comprises a switch state memory to store a switch state of the plurality of switches and a synapse conductance state memory to store a synapse conductance state of the associated synapses, the method further comprising:
retrieving a stored switch state from the switch state memory and retrieving a stored synapse conductance state from the synapse conductance state memory during a time slot of the synaptic time multiplexing cycle, the stored switch state and the stored synapse conductance state corresponding to the time slot;
using the retrieved switch state to set a switch of the plurality of switches during the time slot; and
using the retrieved synapse conductance state to set a synapse of the associated synapses during the time slot.

14. The method of synaptic time multiplexing of claim 13, wherein the synapse provides spike timing dependent plasticity, and wherein using the retrieved synapse conductance state comprises:
updating the synapse conductance state of the synapse according to a spike timing dependent plasticity rule during the time slot; and
storing the updated synapse conductance state in the synapse conductance state memory,
wherein updating and storing are performed during the time slot.

15. The method of synaptic time multiplexing of claim 11, further comprising converting a description of the fully connected neural network into a synaptic time multiplexing compatible routing schedule, the synaptic time multiplexing compatible routing schedule both to assign the neurons and the associated synapses to different ones of the time slots of the synaptic time multiplexing cycle of the neuromorphic network and to provide connection routing between the assigned neurons and associated synapse during the time slots.

16. The method of synaptic time multiplexing of claim 11, further comprising providing connection routing verification by comparing a binary image representing connection routing in the time slots to a binary image created from a connection matrix of the fully connected neural network.

* * * * *